United States Patent
Isoda (10) Patent No.: US 11,482,845 B2
(45) Date of Patent: Oct. 25, 2022

(54) ELECTRICAL WIRE GUIDING APPARATUS

(71) Applicant: SUMITOMO WIRING SYSTEMS, LTD., Mie (JP)

(72) Inventor: Kazuma Isoda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/183,612

(22) Filed: Feb. 24, 2021

(65) Prior Publication Data
US 2021/0288480 A1 Sep. 16, 2021

(30) Foreign Application Priority Data
Mar. 13, 2020 (JP) ............................. JP2020-043859

(51) Int. Cl.
*F16L 3/00* (2006.01)
*H02G 3/06* (2006.01)
*H02G 3/04* (2006.01)

(52) U.S. Cl.
CPC ......... *H02G 3/0608* (2013.01); *H02G 3/0437* (2013.01)

(58) Field of Classification Search
None
See application file for complete search history.

(56) References Cited

U.S. PATENT DOCUMENTS

| | | | | |
|---|---|---|---|---|
| 5,638,672 A * | 6/1997 | Furukawa | ............... | F16G 13/16 59/78.1 |
| 6,725,642 B2 * | 4/2004 | Tsutsumi | ............... | F16G 13/16 59/900 |
| 6,992,254 B2 | 1/2006 | Komiya | | |
| 8,674,222 B2 * | 3/2014 | Hsieh | ...................... | F16L 3/015 174/68.2 |
| 2005/0198937 A1* | 9/2005 | Komiya | .................. | F16G 13/16 59/78.1 |
| 2008/0236131 A1* | 10/2008 | Komiya | .................. | F16G 13/16 59/78.1 |
| 2011/0185697 A1* | 8/2011 | Egami | ..................... | F16G 13/16 59/78.1 |
| 2017/0037985 A1* | 2/2017 | Lin | ........................ | H02G 11/00 |
| 2021/0285518 A1* | 9/2021 | Isoda | ...................... | F16G 13/16 |

* cited by examiner

*Primary Examiner* — Steven M Marsh
(74) *Attorney, Agent, or Firm* — Venjuris, P.C.

(57) ABSTRACT

An electrical wire guiding apparatus 10 includes a plurality of link members 20 that are pivotably connected in series, and each have an accommodation space 25 for an electric wire W provided therein. Each of the plurality of link members 20 includes a link body 20A in which a surface positioned on an inner side of a bend in a pivoted state is open as an opening surface 20C, and a cover 20B that is engaged with the link body 20A, and blocks the opening surface 20C.

5 Claims, 8 Drawing Sheets

ELECTRICAL WIRE GUIDING APPARATUS

CROSS-REFERENCE TO RELATED APPLICATIONS

This application is based on and claims priority from Japanese Patent Application No. 2020-043859, filed on Mar. 13, 2020, with the Japan Patent Office, the disclosure of which is incorporated herein in their entireties by reference.

TECHNICAL FIELD

This disclosure relates to an electrical wire guiding apparatus.

BACKGROUND

Japanese Patent Laid-open Publication No. 2005-344916 discloses a cable protection-guide device in which a plurality of link frame bodies (link members) are pivotably connected. In Japanese Patent Laid-open Publication No. 2005-344916, each link frame body includes link plates (link bodies) and an outer-circumferential-side-of-bend connecting plate (cover). In this cable protection-guide device, an opening surface is formed on the outer side of a bend, and the outer-circumferential-side-of-bend connecting plate is attached to the opening surface.

SUMMARY

When this cable protection-guide device is bent, a cable accommodated therein produces a force acting to return from a bent state to a non-bent state. In this case, the cable applies, to the outer-circumferential-side-of-bend connecting plate, a force acting in a direction away from the link plates. Therefore, there is a concern that the outer-circumferential-side-of-bend connecting plate will be detached from the link plates.

The present disclosure has been made based on the above-described circumstances, and aims to provide an electrical wire guiding apparatus that can favorably maintain a state where a link body and a cover are connected.

An electrical wire guiding apparatus according to the present disclosure includes: a plurality of link members that are pivotably connected in series, and have accommodation spaces for an electric wire provided therein, and each of the plurality of link members includes a link body in which a surface positioned on the inner side of a bend in a pivoted state is open as an opening surface, and a cover that is engaged with the link body, and blocks the opening surface.

An electrical wire guiding apparatus according to the present disclosure can favorably maintain a state where a link body and a cover are connected.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure will be listed and described.

(1) An electrical wire guiding apparatus according to the present disclosure includes: a plurality of link members that are pivotably connected in series, and have accommodation spaces for an electric wire provided therein, and each of the plurality of link members includes a link body in which a surface positioned on the inner side of a bend in a pivoted state is open as an opening surface, and a cover that is engaged with the link body, and blocks the opening surface.

According to this configuration, if the electric wire is bent when the link members pivot, a reactive force of the electric wire caused by bending acts on the surfaces positioned on the outer side of the bend of the link members. If the cover is provided on the surface positioned on the outer side of a bend of a link body, there is a concern that the cover will be subjected to a reactive force of the electric wire, and engagement between the cover and the link body will be released. However, in this electrical wire guiding apparatus, the cover is provided on the inner side of a bend of each link body, and thus a reactive force of the electric wire caused by bending does not directly act on the cover, and it is possible to favorably maintain an engagement state between the link body and the cover. Here, to "block" is not limited to blocking an entire opening surface, and includes blocking a portion of an opening surface.

(2) It is preferred that, regarding the plurality of link members, adjacent link bodies come into contact with each other in the pivoted state, thereby limiting a bending angle relative to each other, and, regarding the plurality of link members, the cover is disposed at a position at which the cover does not come into contact with the adjacent link member in a state where the bending angle is limited. According to this configuration, it is possible to more reliably avoid a situation where the cover is detached from the link body.

(3) Regarding the plurality of link members, adjacent link bodies are preferably configured to come into surface contact with each other in the pivoted state. According to this configuration, it is possible to distribute a force acting on the link body, and prevent deformation and the like of a contact section of the link body.

(4) Regarding the plurality of link members, the cover preferably includes an inclined portion inclined in an inclination direction corresponding to the bending angle so as to separate from an adjacent link body. According to this configuration, the inclined portion keeps pivoting of the link members from being interrupted. In addition, if the inclined portion is provided, it is possible to prevent a decrease in the size of the cover, and thus a larger area of the accommodation space can be covered.

DETAILS OF EMBODIMENT OF PRESENT DISCLOSURE

First Embodiment

A first embodiment will be described below with reference to FIGS. 1 to 8. An electrical wire guiding apparatus 10 according to the first embodiment is provided so as to span between the body of a vehicle and a sliding door.

Figure 1:
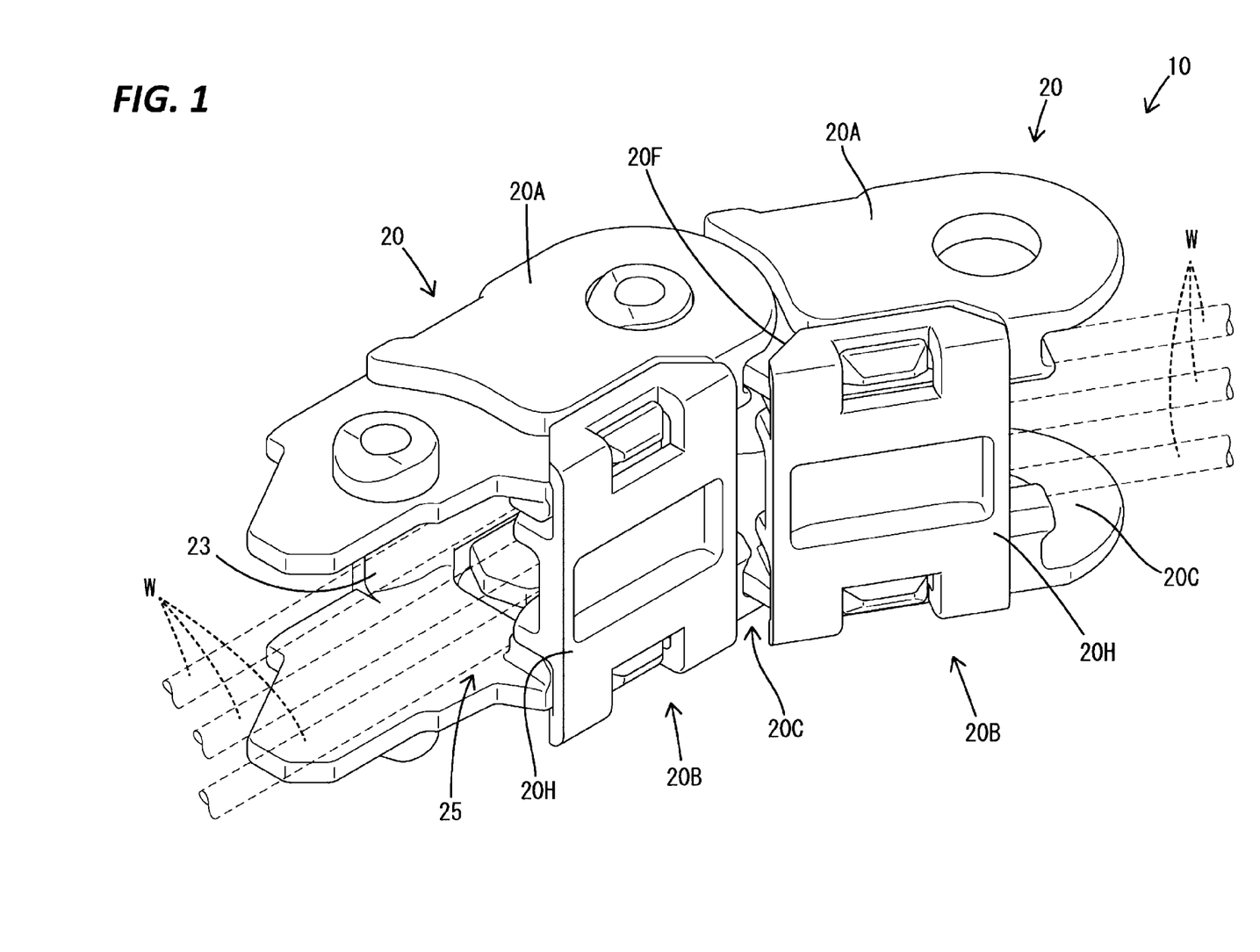
FIG. 1 is a perspective view of link members connected adjacently in the alignment direction, in an electrical wire guiding apparatus according to a first embodiment.

As shown in FIG. 1, the electrical wire guiding apparatus 10 includes a plurality of link members 20. The link members 20 are aligned and connected in series in a state where adjacent link members 20 can pivot relative to each other. One end of the link members 20 in the alignment direction is connected to a vehicle body-side bracket (not illustrated), and the other end of the link members 20 in the alignment direction is connected to a door-side bracket (not illustrated). An accommodation space 25 into which a plurality of electric wires W for supplying power to an electrical component mounted on the sliding door are inserted is formed inside of each of the link members 20.

Note that, in the following description, for convenience, one side of the link members 20 in the alignment direction, namely the side on which the vehicle body-side bracket is positioned is defined as the "front side", and the other side of the link members 20 in the alignment direction, namely the side on which the door-side bracket is positioned is defined as the "rear side". The front side is on the right in FIG. 1, and the rear side is on the left in FIG. 1. The upper side refers to the upward direction in FIG. 1, and the lower side refers to the downward direction in FIG. 1.

Figure 2:
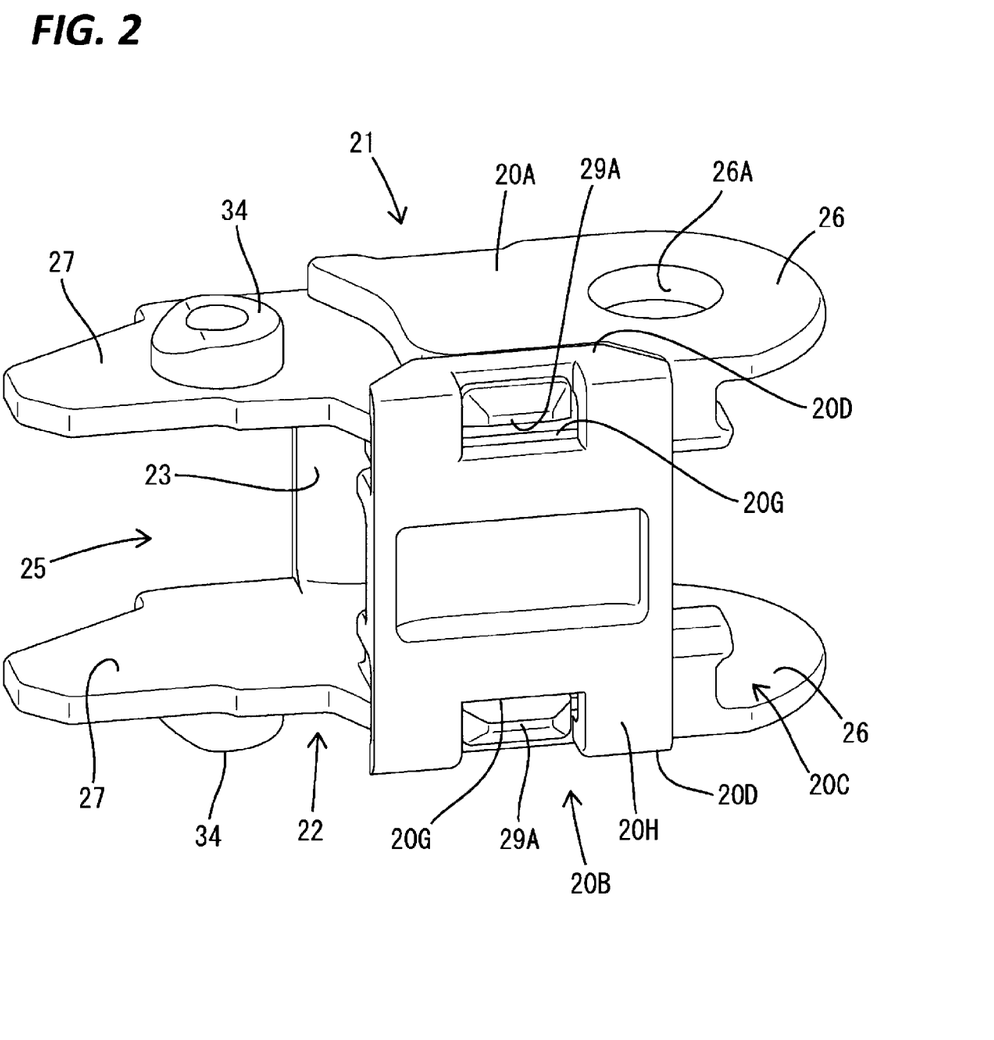
FIG. 2 is a perspective view of a link member.
Figure 3:
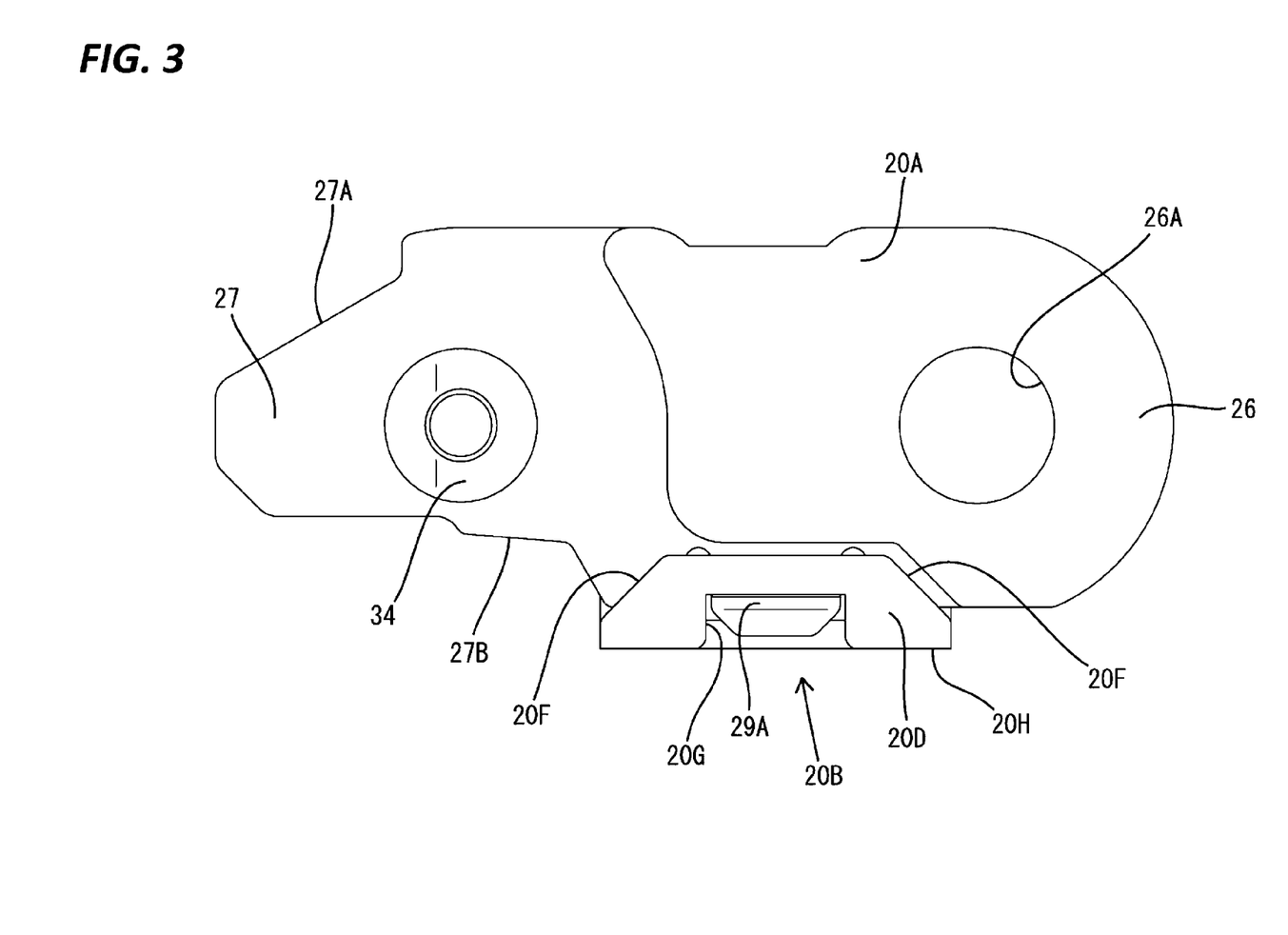
FIG. 3 is a plan view of a link member.

As shown in FIGS. 2 and 3, each of the link members 20 includes a link body 20A and a cover 20B. The link body 20A and the cover 20B are made of a synthetic resin. The link body 20A includes a pair of opposing portions 21 and 22 and an arm portion 23 that couples these opposing portions 21 and 22. The pair of opposing portions 21 and 22 have a plate-like shape, and are disposed in parallel with a predetermined distance provided therebetween.

Figure 4:
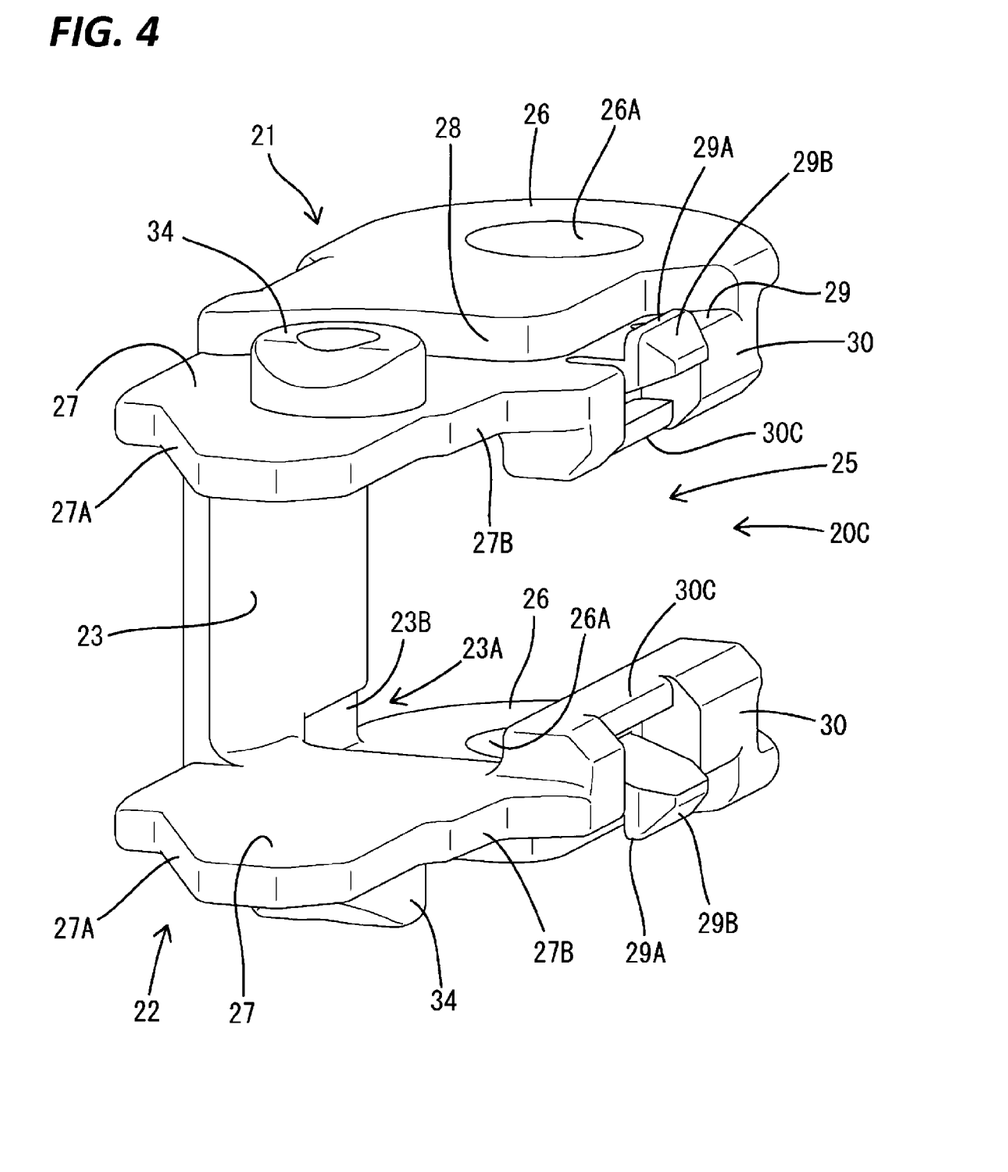
FIG. 4 is a perspective view of a link body when viewed obliquely from the rear side.
Figure 5:
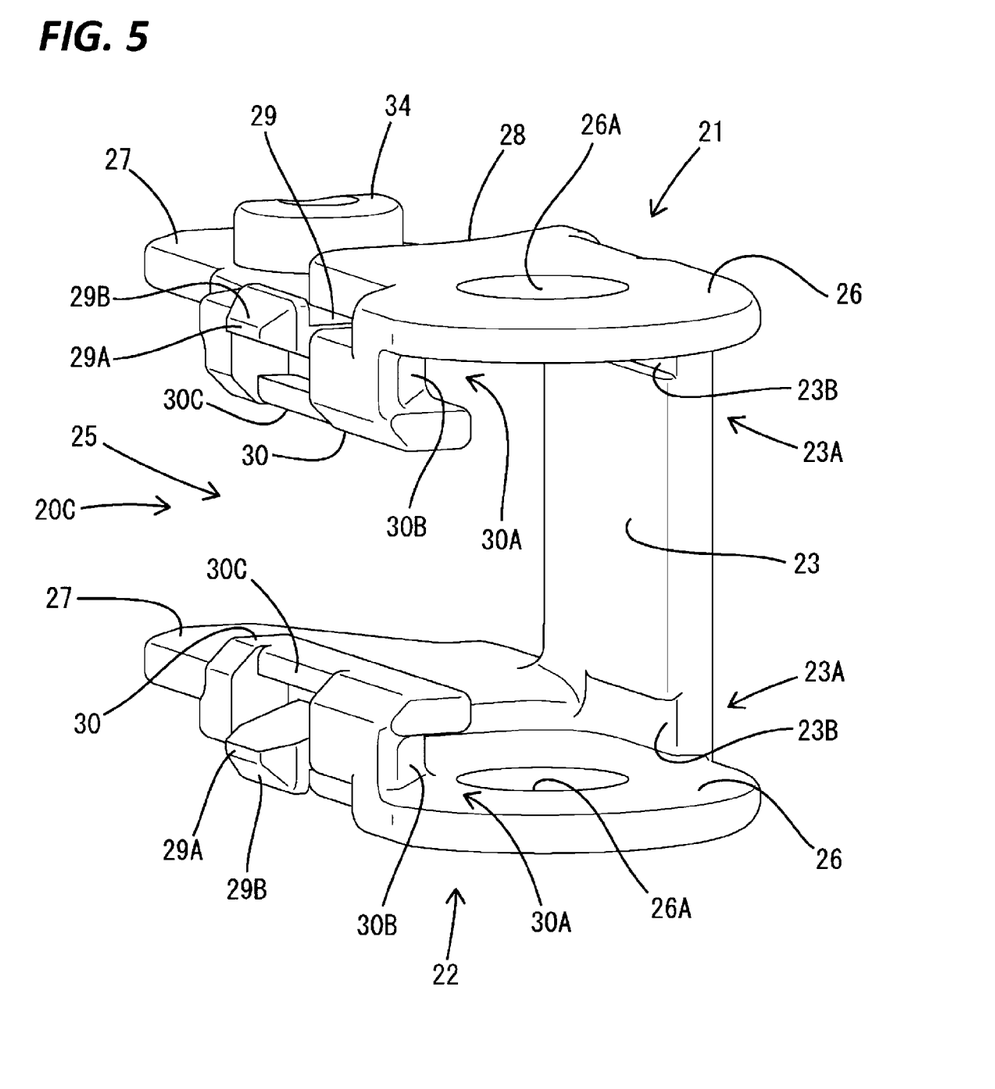
FIG. 5 is a perspective view of a link body when viewed obliquely from the front side.

As shown in FIGS. 4 and 5, the arm portion 23 has a plate-like shape. The arm portion 23 is connected to end edge portions of the opposing portions 21 and 22 at a right angle to the opposing portions 21 and 22. First groove portions 23A are formed at portions of the arm portion 23 in which the arm portion 23 is coupled to the opposing portions 21 and 22, respectively. Bottom surfaces 23B of the first groove portions 23A are formed so as to be recessed at the portions of the arm portion 23 in which the arm portion 23 is connected to the opposing portions 21 and 22, respectively. In the link body 20A, the internal region surrounded by the pair of opposing portions 21 and 22, the arm portion 23, and the cover 20B is configured as the accommodation space 25 that accommodates an electric wire W. The end edge portions of the pair of opposing portions 21 and 22 that sandwich the accommodation space 25 and are positioned on the opposite side to the arm portion 23 form an opening surface 20C by which the pair of opposing portions 21 and 22 are spaced apart.

The pair of opposing portions 21 and 22 extend in the front-and-rear direction in a pair so as to sandwich the accommodation space 25. Each of the opposing portions 21 and 22 includes a front portion 26, a rear portion 27, a step portion 28, and a protruding portion 30. The front portion 26 is positioned on the front side. The rear portion 27 is positioned on the rear side. The step portion 28 is positioned between the front portion 26 and the rear portion 27. The front portion 26 and the rear portion 27 have a plate-like shape elongated in the front-and-rear direction. The rear portion 27 is disposed on the inner side relative to the front portion 26 by an amount that corresponds to the step portion 28.

A through hole 26A is formed in the front portion 26 so as to pass through the front portion 26 in the plate-thickness direction. The edge portion of the front portion 26 on the front side is formed concentrically with the through hole 26A in the shape of an arc. The rear portion 27 includes a shaft portion 34 on the outer surface thereof. The shaft portion 34 adopts a mode of protruding in a columnar shape on the outer surface of the rear portion 27. The outer diameter of the shaft portion 34 is smaller than the inner diameter of the through hole 26A. The leading end surface of the shaft portion 34 on the front side is formed in a flat shape, and the leading end surface of the shaft portion 34 on the rear side is inclined rearward so as to reduce the height of protrusion (see FIG. 4).

The rear portion 27 includes a first straight-line portion 27A and a second straight-line portion 27B. The first straight-line portion 27A is a portion of the rear portion 27 in which the end edge positioned on the arm portion 23 side is linearly formed. The first straight-line portion 27A is inclined rearward in the direction approaching the opening surface 20C. The second straight-line portion 27B is a portion of the rear portion 27 in which the end edge positioned on the opening surface 20C side is linearly formed. The second straight-line portion 27B is inclined rearward in a direction approaching the arm portion 23. At the end edge of the rear portion 27 positioned on the opening surface 20C side, the second straight-line portion 27B protrudes in a direction away from the arm portion 23 farther than the front side thereof. Compared with a case where the second straight-line portion 27B does not protrude away the arm portion 23 more than on the front side, the plate width of the rear portion 27 is increased, and thus the effect of reinforcing the rear portion 27 is achieved.

The rear portion 27 includes an engagement portion 29. The engagement portion 29 extends along the end edge portions of the opposing portions 21 and 22 sandwiching the accommodation space 25 and positioned on the opposite side to the arm portion 23. The engagement portion 29 includes a claw portion 29A protruding outward. The claw portion 29A includes a tapered portion 29B inclined inward as it separates from the arm portion 23. The claw portion 29A and the front portion 26 are positioned at positions separated from each other.

The protruding portion 30 protrudes inwardly from the end edge portions of the opposing portions 21 and 22 that sandwich the accommodation space 25 and are positioned on the opposite side to the arm portion 23. The protruding portion 30 extends in the front-and-rear direction along end edge portions of the opposing portions 21 and 22 sandwiching the accommodation space 25 and positioned on the opposite side to the arm portion 23. A second groove portion 30A is formed in a front end portion of the protruding portion 30 (see FIG. 5). A bottom surface 30B of the second groove portion 30A is inclined rearward so as to approach the arm portion 23. An intermediate portion 30C is provided in each protruding portion 30. The intermediate portion 30C connects a front portion and a rear portion of the protruding portion 30. The internal surface of the intermediate portion 30C is flush with the internal surface of the front portion of the protruding portion 30 and the internal surface of the rear portion.

Figure 6:
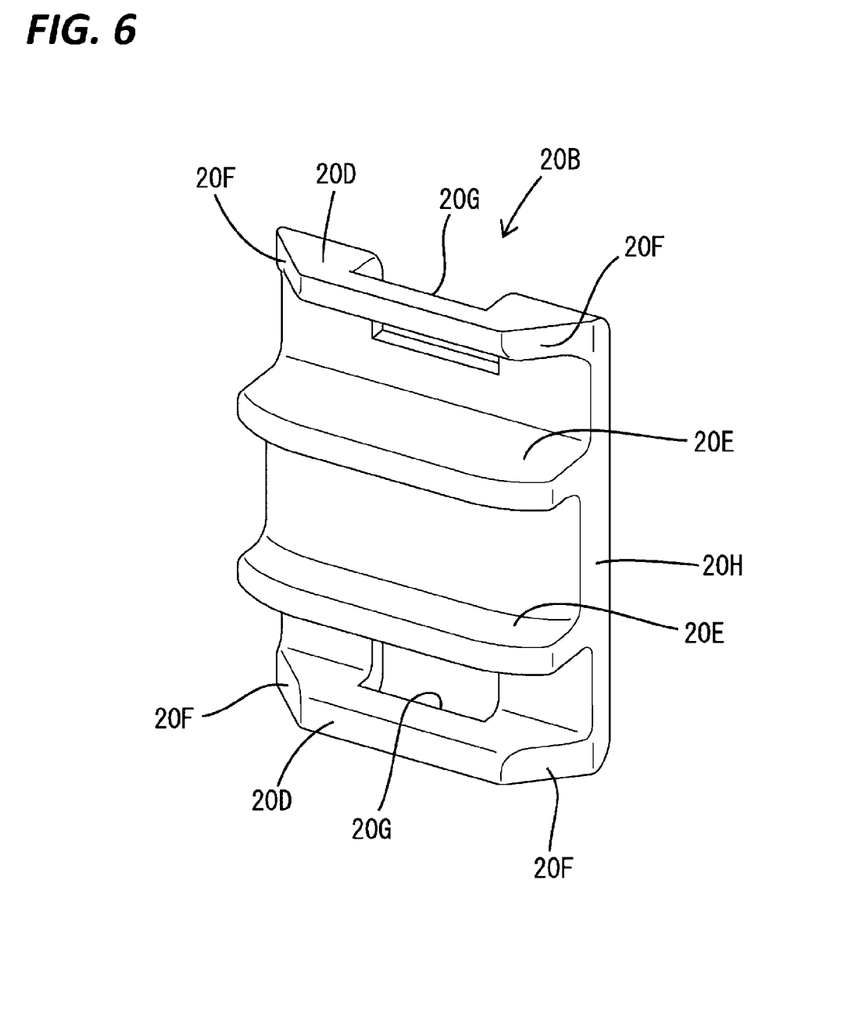
FIG. 6 is a perspective view of a cover.

As shown in FIG. 6, the cover 20B includes a cover body 20H, a pair of engagement portions 20D, and a pair of supporting portions 20E. The cover body 20H is approximately quadrangular, and has a plate-like shape. The engagement portions 20D extend along the upper and lower end edge portions of the cover body 20H, appearing as being bent from these end edge portions. A pair of inclined portions 20F are formed in each of the engagement portions 20D. These inclined portions 20F are formed at the front and rear end portions of the engagement portions 20D. These inclined portions 20F are inclined toward the leading end of the engagement portions 20D so as to shorten the distance therebetween. The inclined portions 20F positioned on the rear side from among these inclined portions 20F are inclined so as to separate from the front portion 26 of the adjacent link body 20A in a state where the link members 20 are connected (see FIG. 1). In the center of each engagement portion 20D, an engagement hole 20G is formed so as to pass through the engagement portion 20D. The engagement holes 20G pass through the engagement portions 20D and also the cover body 20H adjacent to the engagement portion 20D. The supporting portions 20E each have a plate-like shape. The supporting portions 20E are connected to the cover body 20H in parallel with the engagement portions 20D with a predetermined gap from the engagement portions 20D. The supporting portions 20E are disposed so as to respectively oppose the engagement portions 20D.

As shown in FIG. 2, the cover 20B is disposed on the opposite side to the arm portion 23, sandwiching the accommodation space 25. The cover 20B is attached to the link body 20A as a result of the claw portions 29A of the link body 20A engaging with the engagement holes 20G of the engagement portions 20D, and blocks the opening surface 20C. In other words, the cover 20B is engaged with the link body 20A, and blocks the opening surface 20C. When the cover 20B is attached to the link body 20A, the supporting portions 20E are disposed inward of the protruding portions 30 (see FIG. 7). Accordingly, it is possible to suppress inward deformation of the opposing portions 21 and 22.

Figure 7:
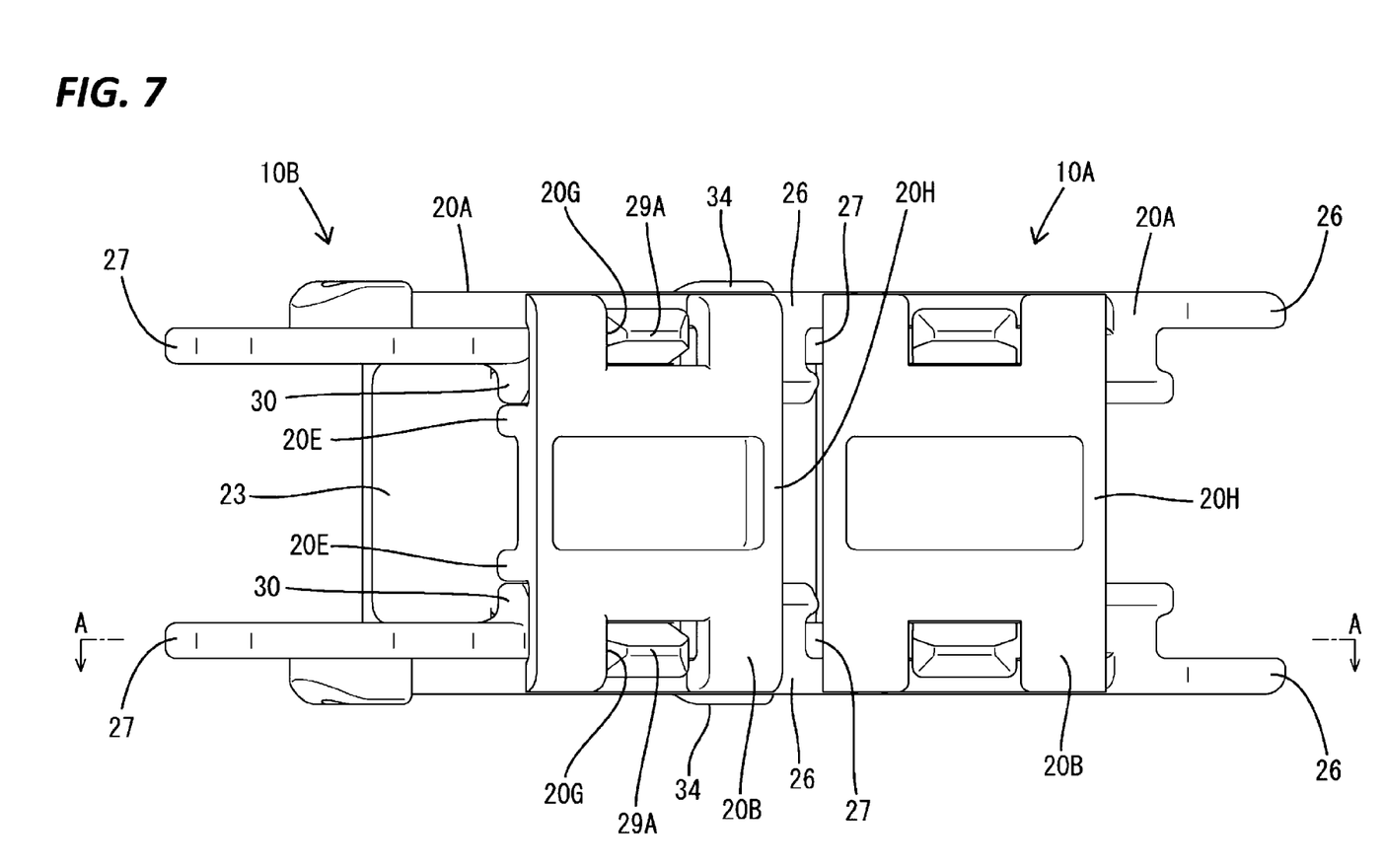
FIG. 7 is a side view of link members connected adjacently in the alignment direction.
Figure 8:
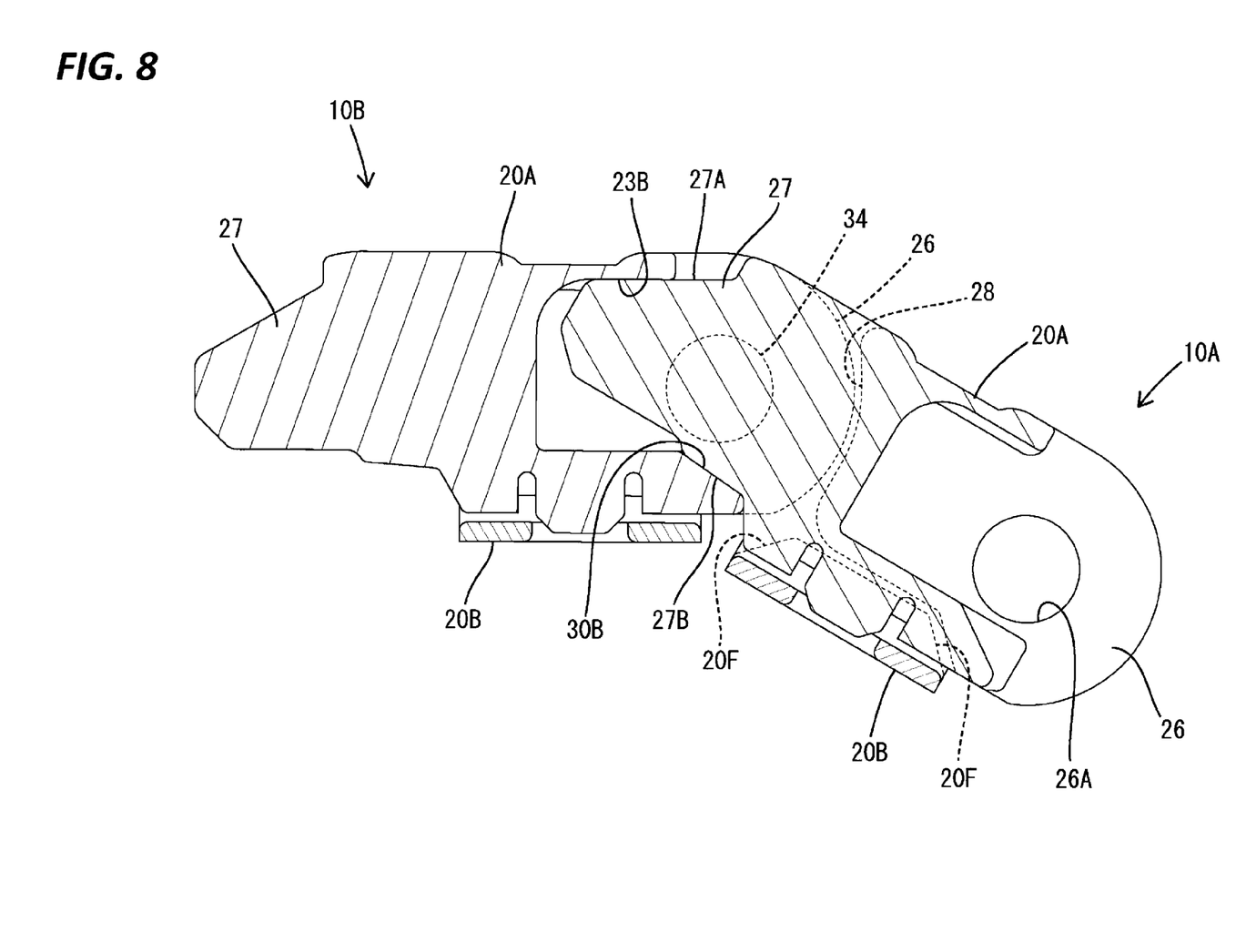
FIG. 8 is a cross-sectional view taken along a line A-A in FIG. 7.

As shown in FIG. 7, regarding a plurality of link members 20 that are connected, from among link members 20 aligned in the front-and-rear direction and adjacent to each other, a link member 20 positioned relatively on the front side is defined as a front link member 10A, and a link member 20 positioned relatively on the rear side is defined as a rear link member 10B. In this case, the front portion 26 of the rear link member 10B and the rear portion 27 of the front link member 10A are arranged such that their plate surfaces overlap in the up-down direction (plate-thickness direction).

In the rear portion 27 of the front link member 10A and the front portion 26 of the rear link member 10B that overlap each other, the shaft portion 34 of the rear portion 27 is inserted into the through hole 26A of the front portion 26 so as to be fitted into the through hole 26A from inside. The leading end surface of the shaft portion 34 is disposed so as to protrude from the through hole 26A. Accordingly, the rear link member 10B can pivot to a predetermined angle about the shaft portion 34 of the rear portion 27, from a state where the rear link member 10B and the front link member 10A are linearly aligned. In this manner, the rear link member 10B and the front link member 10A can pivot relative to each other. The opening surface 20C of the link body 20A is positioned on the inside of a bend in a pivoted state (see FIG. 1). The cover 20B is provided on the side on which the cover 20B is directed to the inner side of a bend when the link members 20 pivot (see FIG. 1).

When the front link member 10A and the rear link member 10B pivot about the shaft portion 34 in the direction in which the covers 20B approach each other, the adjacent arm portions 23 separate from each other. The bottom surface 23B of the first groove portion 23A then comes into surface contact with the first straight-line portion 27A of the rear portion 27 of the front link member 10A. Along with this, the second straight-line portion 27B comes into surface contact with the bottom surface 30B of the second groove portion 30A (see FIG. 8). Specifically, regarding a plurality of link members 20, adjacent link bodies 20A come into surface contact with each other at four different positions in the pivoted state. In addition, the front portion 26 and the rear portion 27 that are connected come into surface contact with each other at two different positions in the pivoted state. Accordingly, when the front link member 10A and the rear link member 10B pivot to a predetermined angle, further pivoting is restricted. Specifically, adjacent link bodies 20A come into contact with each other in the pivoted state, and thus the bending angle relative to each other is limited. The cover 20B is disposed at a position at which the cover 20B does not come into contact with the adjacent link member 20 in a state where the bending angle is limited. Out of the inclined portions 20F of the cover 20B, the inclined portions 20F positioned on the rear side are inclined in the inclination direction corresponding to the bending angle of the adjacent link member 20 (see FIG. 8). The inclined portions 20F are provided in the engagement portions 20D, and thus the cover 20B does not interrupt pivoting of the front portion 26 relative to the rear portion 27.

Next, actions and effects of the first embodiment will be described.

An electrical wire guiding apparatus 10 of the present disclosure includes a plurality of link members 20 that are pivotably connected in series, and have accommodation spaces 25 for an electric wire W provided therein. Each of the plurality of link members 20 includes a link body 20A in which a surface positioned on the inner side of a bend in a pivoted state is open as an opening surface 20C, and a cover 20B that is engaged with the link body 20A, and blocks the opening surface 20C. According to this configuration, if the electric wire W bends when the link members 20 pivot, a reactive force of the electric wire W caused by the bending acts on the surface positioned outside of the bend of the link members 20. If the cover 20B is provided on surface positioned on the outer side of a bend of the link members 20, there is a concern that the cover 20B will be subjected to a reactive force of the electric wire W, and engagement between the cover 20B and the link body 20A will be released. However, in this electrical wire guiding apparatus 10, the cover 20B is provided on the inside of a bend of the link body 20A, and thus a reactive force of the electric wire W caused by bending does not directly act on the cover 20B, and it is possible to favorably maintain the engagement state between the link body 20A and the cover 20B.

Regarding the plurality of link members 20 of the present disclosure, adjacent link bodies 20A come into contact with each other in the pivoted state, thereby limiting a bending angle relative to each other. Regarding the plurality of link members 20, the cover 20B is disposed at a position at which the cover 20B does not come into contact with the adjacent link member 20 in a state where the bending angle is limited.

According to this configuration, it is possible to more reliably avoid a situation where the cover 20B is detached from the link body 20A.

Regarding the plurality of link members 20 of the present disclosure, adjacent link bodies 20A are configured to come into surface contact with each other in the pivoted state. According to this configuration, it is possible to distribute a force acting on the link body 20A, and prevent deformation and the like of a contact section of the link body 20A.

Regarding the plurality of link members 20 of the present disclosure, the cover 20B includes inclined portions 20F inclined in an inclination direction corresponding to the bending angle so as to separate from an adjacent link body 20A. According to this configuration, the inclined portions 20F keep pivoting of the link members 20 from being interrupted. In addition, if the inclined portions 20F are provided, it is possible to prevent a decrease in the size of the cover 20B, and thus a larger area of the accommodation space 25 can be covered.

Other Embodiment

The present invention is not limited to the embodiment described in the description above and the drawings, and is defined by the scope of the appended claims. All changes that fall within the same essential spirit as the scope of the claims are included in the present invention, and the following embodiments are also intended to be included therein.

(1) The number of positions at which adjacent link bodies come into surface contact with each other when pivoted at a predetermined angle, does not need to be four, and may be one to three, or five or larger.

(2) The orientation in which the electrical wire guiding apparatus is connected to the door-side bracket and the vehicle body-side bracket may be reversed.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An electrical wire guiding apparatus comprising:
a plurality of links that are pivotably connected in series, and have accommodation spaces for an electric wire provided therein,
wherein each of the plurality of links includes:
    a link body in which a surface positioned on an inner side of a bend is open as an opening surface in a pivoted state, and
    a cover that includes a pair of engaging protrusions provided at both ends of the cover and is engaged with the link body, and blocks the opening surface using the pair of engaging protrusions, and
wherein each of the pair of engaging protrusions includes a pair of inclined surfaces that are provided at front and rear ends of one of the pair of engaging protrusions when viewed from a side.

2. The electrical wire guiding apparatus according to claim 1,
wherein adjacent link bodies among the plurality of links come into contact with each other in the pivoted state, thereby limiting a bending angle relative to each other, and
regarding the cover of each of the plurality of links is disposed at a position at which the cover does not come into contact with an adjacent link in a state where the bending angle is limited.

3. The electrical wire guiding apparatus according to claim 1,
wherein adjacent link bodies among the plurality of links are configured to come into a surface contact with each other in the pivoted state.

4. The electrical wire guiding apparatus according to claim 2,
wherein each of the pair of inclined surfaces is inclined in an inclination direction corresponding to the bending angle so as to separate from an adjacent link body.

5. The electrical wire guiding apparatus according to claim 1, wherein the pair of inclined surfaces are inclined toward a leading end of one of the pair of engaging protrusions so as to shorten a distance between the pair of inclined surfaces.

* * * * *